United States Patent [19]

Kuhlmann et al.

[11] 4,229,819

[45] Oct. 21, 1980

[54] DATA TRANSMISSION SYSTEM

[75] Inventors: Joachim Kuhlmann; Helmut Moser, both of Heilbronn, Fed. Rep. of Germany

[73] Assignee: Licentia Patent-Verwaltungs-G.m.b.H., Frankfurt am Main, Fed. Rep. of Germany

[21] Appl. No.: 898,866

[22] Filed: Apr. 21, 1978

[30] Foreign Application Priority Data

Apr. 23, 1977 [DE] Fed. Rep. of Germany ....... 2718226

[51] Int. Cl.³ .............................................. H03K 7/06
[52] U.S. Cl. ......................................... 375/23; 375/45
[58] Field of Search ............... 250/199; 325/163, 141, 325/143; 340/203, 204, 206

[56] References Cited

U.S. PATENT DOCUMENTS

| | | | |
|---|---|---|---|
| 3,997,855 | 12/1976 | Nash | 325/163 |
| 4,027,152 | 5/1977 | Brown et al. | 250/199 |
| 4,068,198 | 1/1978 | Otto | 325/163 |

*Primary Examiner*—Benedict V. Safourek
*Assistant Examiner*—Michael Allen Masinick
*Attorney, Agent, or Firm*—Spencer & Kaye

[57] ABSTRACT

A data transmission system comprises a transmitter and a receiver in which, on the occurrence of a sequence of identical bits, only the first bit is transmitted, the remainder of the sequence being replaced by pauses of corresponding length.

8 Claims, 5 Drawing Figures

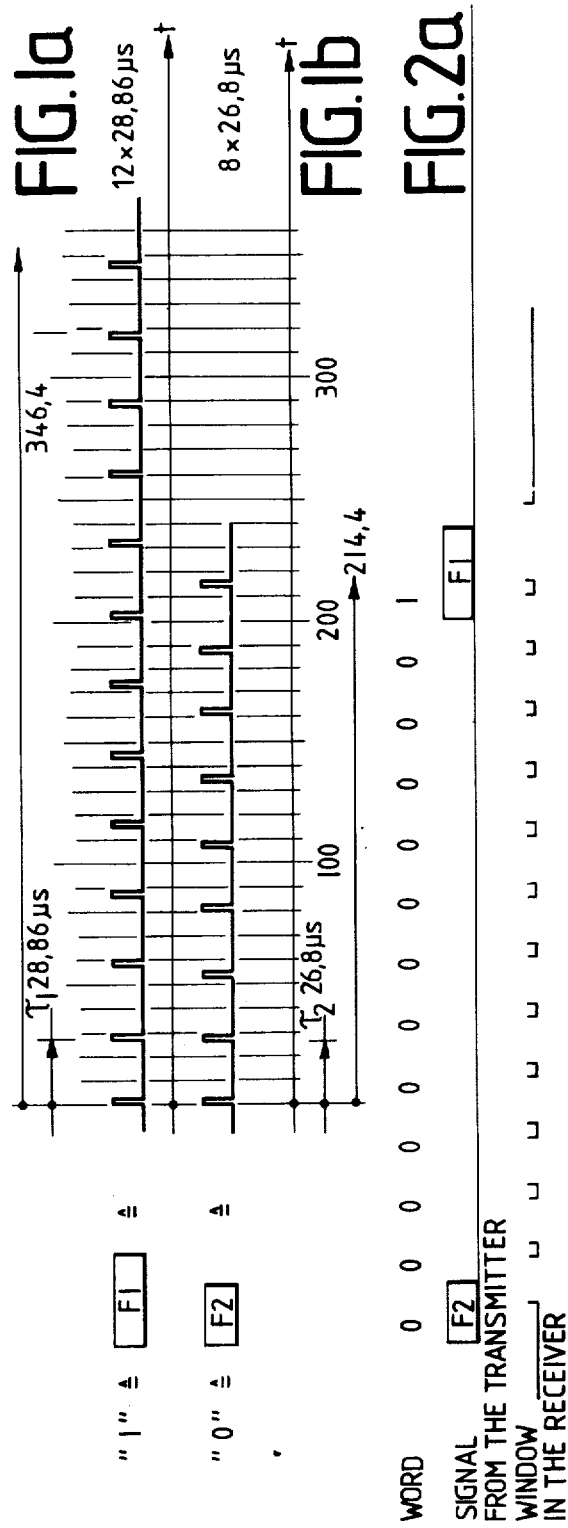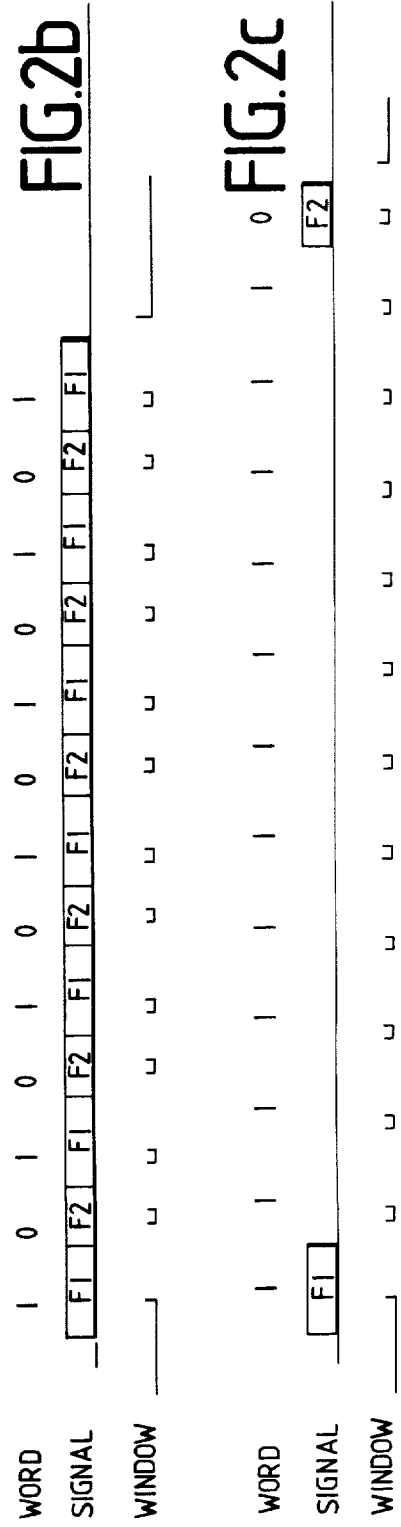

DATA TRANSMISSION SYSTEM

BACKGROUND OF THE INVENTION

The invention relates to a data transmission system comprising a transmitter and a receiver in which a digitalized word with a defined bit number is transmitted with logic "1" formed by a number of pulses of a first frequency and the logic "0" formed by a number of pulses of a second frequency.

When transmitting data which is effected for example via an infra-red path between a transmitter and a receiver, a check system must be present which ensures that data transmission is as free of errors as possible. With a known system this checking takes place by transmitting each digitalized word which comprises 12 bits, for example, twice. If the two words agree, then there is a high probability that error-free data transmission is ensured.

These data transmission systems comprise an infrared transmitter for example and a suitable receiver circuit in a television device. With these remote control systems, there is the desire to keep the energy consumption at the transmission and as low as possible.

SUMMARY OF THE INVENTION

It is an object of the invention to propose a new principle of transmission in a data transmission system, such as that of the type described at the outset, which can manage with the least possible energy at the transmitter end.

According to a first aspect of the invention, there is provided a data transmission system comprising a transmitter, a receiver for receiving the transmitted data, and means in the transmitter for transmitting only the first bit of a number of identical bits when these occur together and for transmitting pauses for the remaining bits of said identical bits of a length corresponding to the length of said first bit.

According to a second aspect of the invention, there is provided a data transmission system comprising a transmitter and a receiver in which a digitalized word with a defined bit number is transmitted by the fact that the logic "1" is formed by a number of pulses of a first frequency and the logic "0" is formed by a number of pulses of a second frequency, characterized in that with a sequence of similar bits within a word only the first bit respectively is transmitted while the remaining similar bits are defined by a pause of appropriate length.

BRIEF DESCRIPTION OF THE DRAWINGS

The invention will now be described in greater detail, by way of example, with reference to the drawings, in which:

FIG. 1a illustrates a pulse sequence for a logic 1;

FIG. 1b illustrates a pulse sequence for a logic 0;

FIG. 2a illustrates the make ups of a word in accordance with the invention, and FIGS. 2b and 2c show, similarly to FIG. 2a further word make ups.

DESCRIPTION OF THE PREFERRED EMBODIMENTS

In a preferred embodiment of the invention, in a data transmission system, only the first bit is transmitted in a sequence of similar bits within a word while the remaining similar bits are defined by a pause of appropriate length.

In order to check for errors, the word which has been transmitted is terminated by a check bit which is complementary to the last bit of the word transmitted. Furthermore, with the data transmission system according to the invention it is of particular advantage if each bit of the two logic instructions "1" and "0" is formed from a different number of pulses of the two frequencies used so that with sequencies of similar bits the pause length is a whole number multiple of the preceding bit length transmitted. As a result, the time length of the two logical instructions "1" and "0" are of different sizes and this facilitates additional checking for errors.

With the data transmission system in accordance with this embodiment, the word received is only accepted by the receiver as a command if the time length of the word corresponds to the instruction received, if the series sequence and length of the transmitted bit are in accordance with the system and this is checked by the complementary check bit and if the individual bits have a position which is correct in terms of time.

By means of this threefold checking a transmission safety is obtained which corresponds to double transmission of a word. On average however, the energy consumption is only 0.36 times this and the time required is only 1.08 times that of transmitting a double word under equal conditions. The slightly larger time requirement results from the necessity of a check bit and from the fact that there must be a pause between two transmitted words which is slightly larger than the maximum word length arising. The saving in energy is due to the fact that a transmitted bit on the receiver side is identified by interrogating a certain number of individual pulses and the period of time during which the next bit has to be interrogated, is fixed. If pulses in the next period of interrogation time should fail to appear, this bit is recognized as being identical to the preceding bit and is inserted accordingly into the word. With the word combinations arising, there are so many sequences of similar bits occurring within the individual words that the energy consumption can be reduced to a third of the normal energy consumption.

The drawing illustrates one embodiment of the invention.

Pulse blocks are shown in FIG. 1 and are used to form the logical instructions "1" and "0". Thus in accordance with FIG. 1a the logical "1" for example is realized by 12 pulses of the frequency F1 = 34.64 kHz. The duration of the clock pulse of an individual pulse thus amounts to approximately $\tau 1 = 28.86$ μsec, so that a total pulse for depicting a "1" lasts approximately 346.4 μsec.

In accordance with FIG. 1b the logic "0" is realized by the frequency F2. For this 8 pulses, for example, of the frequency F2 = 37.31 kHz with a clock pulse time $\tau 2$ of 26.8 μsec and a total duration of the bit of approximately 214.4 μsec are used. The result is that one bit which contains the logic "1" is longer in terms of time than one bit of the logic "0", so that, according to the content of the information of a word comprising 12 bits, for example, completely different word lengths can be formed.

Different words are shown in FIGS. 2a, 2b and 2c. The first word in accordance with FIG. 2a comprises a logic "0" in all bits; the checking bit thus comprises a logic "1". Consequently the transmitter initially transmits a pulse block of the frequency F2 with a time duration of 214.4 μsec during the first bit. Since the subsequent 11 bits agree with the first bit, each bit is replaced by a pause which is equal in time to the pulse block F2. With recognition of the first bit as a logic "0" the interrogation time is simultaneously fixed for the next bit. This interrogation time should detect at least two clock pulses of the frequencies F1 and F2. In preferred manner, this window is selected however so that 4 pulses of the frequency F1 and at least two pulses of frequency F2 can be detected. Since only one pulse block of the frequency F1 can follow a pulse block of the frequency F2, the window must be arranged in the receiver so that it would lie approximately at the center of the pulse block F1. If, as in the embodiment of FIG. 2a, there is no pulse block, the second bit is in turn recognized as a logical "0" and the interrogation time is fixed for the third bit which in turn can comprise only one pulse block of the frequency F1 or one pause. If in error pulse blocks of the frequencies F2 were to follow each other then, because of the different lengths of the pulse blocks for the logic "1" or the logic "0" within a word, the interrogation window on the receiver side would fall on to a region in which frequencies of both pulse blocks arise so that the error would be recognized.

With the embodiment of FIG. 2a, initially a pulse block of the frequency F2 is transmitted. Then 11 pauses occur so that the pause length is 11 times the frequency block F2 while the last checking bit is realized as a logic "1" by means of a pulse block of the frequency F1. The word length must thus amount to $(12 \times F2) + (1 \times F1)$ if the word accepted is to be correct.

With the transmission system in accordance with the invention only complementary bits can follow each other. However pulse blocks of the same frequency can never occur successively. Maintaining this principle is checked in the word itself and by means of the checking bit.

A word made up of an alternating sequence of logic "1" and "0" bits is shown in FIG. 2b. Since there is no sequence of similar bits within this word no pauses are present either but each pulse block of one frequency is followed by a pulse block of the second frequency. The word length arises from $(6 \times F1) + (6 \times F2) + (1 \times F1)$. The checking bit is a logic "1" and is shown by the pulse block of the frequency F1, since the last bit in the word is a logic "0".

In the third form in accordance with FIG. 2c, another word is shown which comprises only one sequence of logic "1" bits and thus has a checking bit which corresponds to a logic "0". The first bit is transmitted and comprises a pulse block of the frequency F1. Then 11 pauses follow whereby each pause corresponds to the length of a pulse block of the frequency F1. Pauses which follow a pulse block of the frequency F1 are recognized in the receiver sides as a logic "1" and are inserted into the word accordingly. The checking bit comprises a pulse block of the frequency F2 accordingly and this corresponds to a logic "0". This word shown in FIG. 2 is the longest word which occurs. It has a total length of $(12 \times 28.86 \text{ μsec}) + (1 \times 26.80 \text{ μsec})$. The total length is thus just under 4.4 msec so that the pause to the next word must be at least 4.4 msec long.

It has already been pointed out that the transmission safety with the mode of transmission shown is just as large as when transmitting a double word but the average energy consumption can be reduced considerably. The time requirement is increased only insubstantially with respect to transmission of a double word.

It will be understood that the above description of the present invention is susceptible to various modification changes and adaptations.

What is claimed is:

1. A data transmission system for transmitting and receiving a digital signal corresponding to a digitalized word having a defined number of logic "1" and "0" bits, comprising a transmitter for modifying said digitalized word to form said digital signal wherein each sequence of n identical bits of said digitalized word is transmitted as a predetermined number of pulses having a predetermined pulse repetition frequency corresponding to the value of the first bit in said sequence followed by $n-1$ pauses in transmission, each pause having a length corresponding to to the interval during which said pulses corresponding to said first bit were transmitted, each bit representing a logic "1" consisting of a first predetermined number of pulses having a first pulse repetition frequency and each bit representing a logic "0" consisting of a second predetermined number of pulses having a second pulse repetition frequency, and a receiver for receiving said digital signal and converting it to said digitalized word.

2. A data transmission system as defined in claim 1 wherein each of said digitalized words is followed by a checking bit which is complementary of the last bit of the word transmitted.

3. A data transmission system as defined in claim 1 wherein the length of each of said pauses is a whole number multiple of the preceding transmitted bit length.

4. A data transmission system as defined in claim 3, wherein the time lengths of the two logic instructions "1" and "0" are of different value.

5. A data transmission system as defined in claim 1, wherein a bit transmitted to the receiver side is identified by interrogating a certain number of individual pulses and the time is fixed during which the next bit is interrogated and that when pulses in the next interrogation time fail to appear, this bit is recognized as identical to the preceding bit and is inserted into the word accordingly.

6. A data transmission system as defined in claim 5, wherein the interrogation time is so dimensioned and arranged that, when errors occur, pulses of both frequencies arise in one interrogation time within the word.

7. A data transmission system as defined in claim 1, wherein the length and series sequence of the individual bit and the correct position of the individual bit in terms of time is checked in order to recognize errors in the length of the word.

8. A data transmission system as defined in claim 1, wherein the pause between two words is larger than the maximum word length.

* * * * *